Nov. 5, 1957

L. PERAS 2,811,859

DRIVING MECHANISM FOR TRACTORS

Filed Nov. 12, 1953

Nov. 5, 1957 L. PERAS 2,811,859
DRIVING MECHANISM FOR TRACTORS
Filed Nov. 12, 1953 4 Sheets-Sheet 3

Nov. 5, 1957  L. PERAS  2,811,859
DRIVING MECHANISM FOR TRACTORS
Filed Nov. 12, 1953  4 Sheets-Sheet 4

# United States Patent Office 2,811,859
Patented Nov. 5, 1957

2,811,859

DRIVING MECHANISM FOR TRACTORS

Lucien Peras, Billancourt, France, assignor to Regie Nationale des Usines Renault, Billancourt, France Application November 12, 1953, Serial No. 391,686

Claims priority, application France December 20, 1952

3 Claims. (Cl. 74—342)

This invention relates to tractors, and more particularly to agricultural implement-carrying tractors.

A light tractor system, called the balance tractor is known in which the assembly constituted by the engine, the transmission, and the implements, which are assembled rigidly, is articulated around the rear axle of the tractor. This arrangement has in particular the advantage of transferring the maximum weight to the driving wheels, and avoiding the use of an implement-raising system, this being done by reversing the tractor and braking the wheels.

The present invention has for its object to provide in a balance tractor, an assembly comprising the engine, clutch and the gearbox giving six forward speeds and two reverse speeds, with simplified transmissions. The gearbox contains four synchronised speeds, thus facilitating the driving of the tractor. The gearbox is remarkable for its simplicity and smallness; in particular, the output shaft is mounted as the prolongation of the intermediate shaft and with its axis slightly offset in the downward direction.

A specific embodiment of the invention will now be described by way of example with reference to the accompanying drawings in which.

Figure 1:
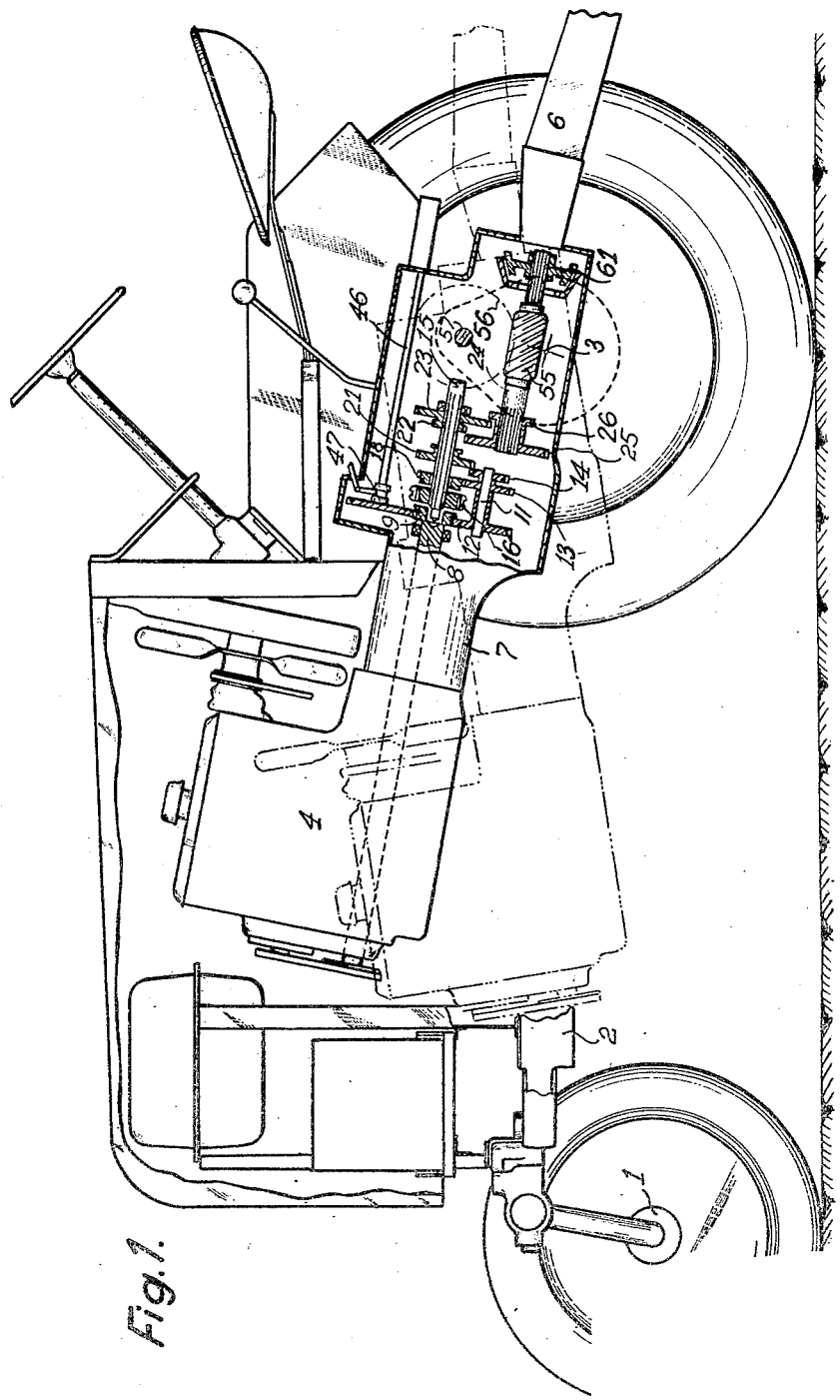
Figure 1 is a view in elevation, with a section through the change speed gear, of a balance tractor according to the invention.
Figure 2:
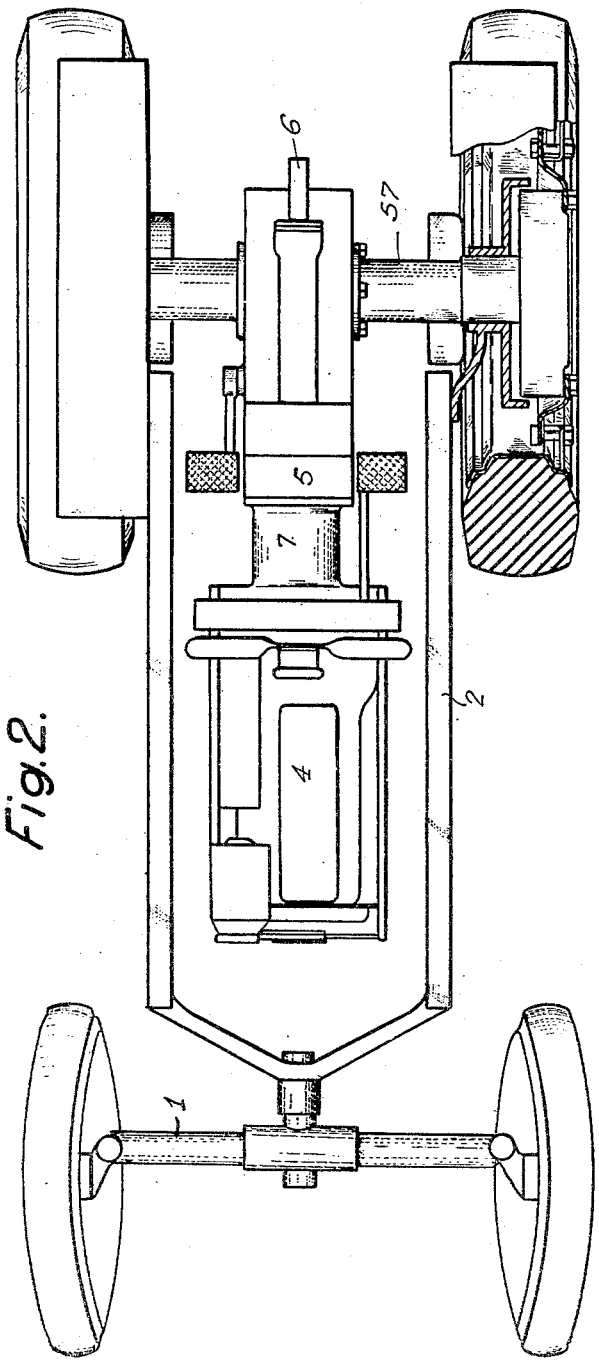
Figure 2 is a plan view of the same tractor.
Figure 3:
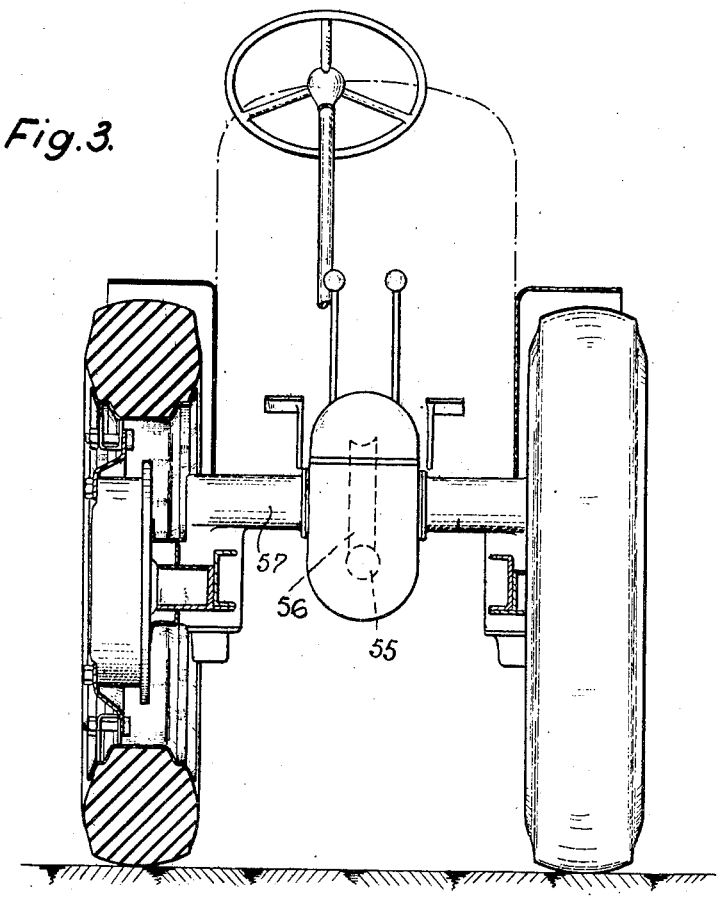
Figure 3 shows a rear view of the tractor.
Figure 6:
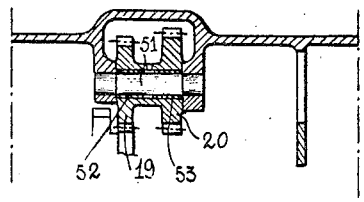
Figure 6 is a view from above of the gearbox, with a section along the line VI—VI in Figure 5.

In Figures 1, 2 and 3, 1 represents the front pivoting axle assembly of the tractor, which is fixed on the chassis 2, which in turn is rotatably mounted around the rear wheel half-shafts 3. These half-shafts 3 serve as pivoting supports for the assembly comprising the engine 4, the transmission 5, and the implement support 6. The clutch, of a known type, is contained inside the casing 7 and transmits its movement to the shaft 8, the end of which carries the gear wheel 9. A fixed intermediate or lay shaft 11 carries a train of pinions 12, 13, 14 turning on it. The pinions 12 and 9 are in constant mesh. The main shaft 15 carries a splined synchromesh sleeve 16 sliding on it. A pinion 17, having clutch teeth 18, is free to rotate on the shaft 15 and is held from translatory movement. The pinion 9 is solid with a clutch member 17¹ provided with teeth 18¹, which is free to rotate on the shaft 15 and is held from translatory movement. The sliding sleeve 16 can be brought into engagement with either the clutch teeth 18 of the pinion 17, or the teeth 18¹ of the clutch member 17¹. The pinion 17 is in constant mesh with the pinion 13. A set of two intermediate pinions (for reverse) 19 and 20 is shown in Figure 6, pinion 19 being in constant mesh with the pinion 14. A splined pinion 21 sliding on the shaft 15 can mesh with pinions 14 or 20. The shaft 15 is solid with the two gear wheels 22 and 23. An output shaft 24 carries an assembly of two splined pinions 25 and 26 sliding on it. The pinion 25 can be put into engagement with pinion 22, and the pinion 26 can come into engagement with the pinion 23.

An upper power take-off shaft 46 carries a pinion 47 which can be put into engagement with the gear wheel 9.

Figure 5:
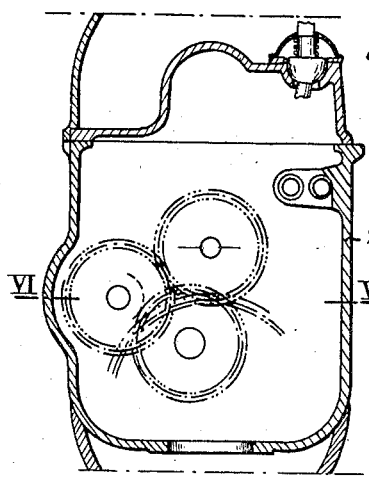
Figure 5 is a cross-section of the gearbox.
Figure 4:
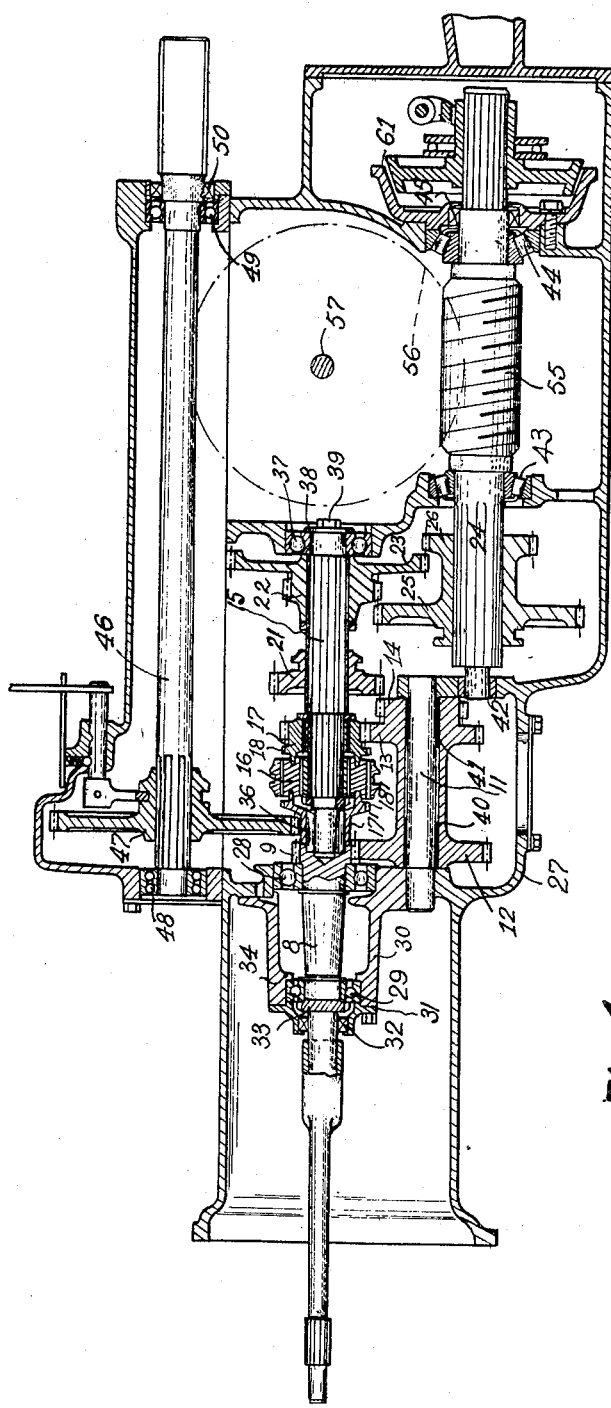
Figure 4 is a section on a larger scale of the gearbox.

In Figures 4 and 5, it is seen that the assembly is contained in a housing 27. The shaft 8 is supported by two ball bearings 28 and 29. The bearing 28 is disposed in a housing in the casing 27, and the bearing 29 is carried in a support 30 bolted to the casing 27. A cap 31 bolted to the support 30 is provided with a stuffing-box 32, which renders the gearbox dust-proof.

The shaft 15 turns in the rollers 36 secured inside the shaft 8, and in a ball bearing 37 disposed in a housing in the casing 27. Bearing 37 is assembled on the shaft 15 with the aid of a washer 38 and screw 39.

The assembly of pinions 12, 13, 14 rests on the axis 11 through the medium of two bronze rings 40 and 41.

The shaft 24 is supported at its front end by a bronze ring 42 and turns on two conical roller bearings 43 and 44. A stuffing-box 45 behind the rollers 44 maintains a contant oil level in the brake chamber.

The power take-off shaft 46 turns in two ball bearings 48 and 49. A stuffing-box 50 provides protection against dust.

The pinions 19 and 20 turn on the shaft 51 through the medium of two rings 52 and 53.

A gear lever enables, the synchromesh sleeve 16 to be brought into engagement with 9 or with 18, and the pinion 21 to be brought into engagement with the pinion 14 or the pinion 20 for reverse, by means of a system of forks of known construction.

The translation of the pinions 25 and 26 is effected with the aid of a second lever.

The pinions 9 and 47, for operating the power take-off shaft 46, are brought into engagement with the aid of a third lever.

The gearbox operates in the following manner:

In order to engage first speed, the following gear wheels are brought into engagement: 9 and 12, 14 and 21, 22 and 25.

For second speed, the following are brought into engagement: 9 and 12, 13 and 17, 22 and 25.

For third speed: 16 and 9 or direct drive, 22 and 25.

For fourth speed: 9 and 12, 14 and 21, 23 and 26.

For fifth speed: 9 and 12, 13 and 17, 23 and 26.

For sixth speed: 16 and 9 or direct drive, 23 and 26.

The first reverse speed is obtained by engaging 9 and 12, 20 and 21, 22 and 25 (14 and 19 being in constant mesh).

The second reverse speed is obtained by engaging: 9 and 12, 20 and 21, 23 and 26 (14 and 19 being in permanent mesh).

Finally, the power take-off shaft 46 can be controlled by engaging or disengaging the pinion 47 with the pinion 9.

The movement of the engine is transmitted to the rear axle via a worm 55 and a worm wheel 56 carrying a differential, to two half-shafts 57 parallel to the axis of the rear wheels. The differential which is equipped with a locking device of known type permits the differential rotation of the wheels. A system of gear wheels transmits the movement from the two half-shafts 57 to the wheels. A brake 61 is disposed at the end of the shaft carrying the worm wheel. The implements are raised by reversing the tractor and braking the wheels.

The drawings illustrate one particular type of tractor selected as an example, but it is obvious that, without changing the spirit of the invention, the improvements of the present invention can be applied to any type of tractor.

I claim:

1. In a tractor, in combination, an input shaft, a colinear main shaft, an intermediate shaft parallel to the main shaft, an output shaft parallel to said main shaft with the axes of said intermediate shaft and said output shaft lying in a common plane, and a power take-off shaft, a first pinion secured to the input shaft, a second pinion rotatably mounted on the main shaft, two third pinions secured to the intermediate shaft with each third pinion in constant meshing relationship with one of said first pinion and said second pinion, a slidable fourth pinion splined on the main shaft, a fifth pinion secured to the intermediate shaft, said splined fourth pinion being adapted for mechanical connection with said fifth pinion for reverse drive, a clutch member on the input shaft and syncromesh means slidably mounted on the main shaft for selective engagement with said clutch member and with said second pinion rotatably mounted on said main shaft, a two-gear wheel rigidly secured on the main shaft, two sixth pinions slidably mounted on the output shaft, each of said sixth pinions being adapted to engage with one of the gears of said two-gear wheel, whereby said output shaft is drivable from said main shaft at two-gear ratios, a seventh pinion slidably mounted on the power take-off shaft for meshing engagement with said first pinion on the input shaft, whereby to provide six forward speeds, two reverse speeds and driving of the power take-off.

2. In a tractor, in combination, an input shaft, a colinear main shaft, an intermediate shaft parallel to the main shaft, an output shaft parallel to said main shaft with the axes of said intermediate shaft and said output shaft lying in a common plane, and a power take-off shaft parallel to and disposed above said main shaft, a first pinion secured to the input shaft, a second pinion rotatably mounted on the main shaft, two third pinions secured to the intermediate shaft with each third pinion in constant meshing relationship with one of said first pinion and said second pinion, a slidable fourth pinion splined on the main shaft, a fifth pinion secured to the intermediate shaft, said splined fourth pinion being adapted for mechanical connection with said fifth pinion for reverse drive, a clutch member on the input shaft and syncromesh means slidably mounted on the main shaft for selective engagement with said clutch member and with said second pinion rotatably mounted on said main shaft, a two-gear wheel rigidly secured on the main shaft, two sixth pinions slidably mounted on the output shaft, each of said sixth pinions being adapted to engage with one of the gears of said two-gear wheel, whereby said output shaft is drivable from said main shaft at two-gear ratios, a seventh pinion slidably mounted on the power take-off shaft for meshing engagement with said first pinion on the input shaft, whereby to provide six forward speeds, two reverse speeds and driving of the power take-off.

3. In a tractor having driving wheels, in combination, an input shaft, a colinear main shaft, an intermediate shaft parallel to the main shaft, an output shaft parallel to said main shaft with the axes of said intermediate shaft and said output shaft lying in a common plane, and a power take-off shaft, a first pinion secured to the input shaft, a second pinion rotatably mounted on the main shaft, two third pinions secured to the intermediate shaft with each third pinion in constant meshing relationship with one of said first pinion and said second pinion, a slidable fourth pinion splined on the main shaft, a fifth pinion secured to the intermediate shaft, said splined fourth pinion being adapted for mechanical connection with said fifth pinion for reverse drive, a clutch member on the input shaft and syncromesh means slidably mounted on the main shaft for selective engagement with said clutch member and with said second pinion rotatably mounted on said main shaft, a two-gear wheel rigidly secured on the main shaft, two sixth pinions slidably mounted on the output shaft, each of said sixth pinions being adapted to engage with one of the gears of said two-gear wheel, whereby said output shaft is drivable from said main shaft at two-gear ratios, a seventh pinion slidably mounted on the power take-off shaft for meshing engagement with said first pinion on the input shaft, whereby to provide six forward speeds, two reverse speeds and driving of the power take-off, and a worm gear actuated by said output shaft for transmitting movement to said driving wheels.

References Cited in the file of this patent

UNITED STATES PATENTS

| | | |
|---|---|---|
| 2,135,042 | Rossman | Nov. 1, 1938 |
| 2,223,522 | Kysor | Dec. 3, 1940 |
| 2,618,979 | Benning | Nov. 25, 1952 |
| 2,672,056 | Stone | Mar. 16, 1954 |